United States Patent
Davis et al.

(10) Patent No.: US 7,060,949 B1
(45) Date of Patent: Jun. 13, 2006

(54) END SEAL DESIGN FOR TEMPERATURE SENSING PROBES

(75) Inventors: Wayne Davis, Barrington, IL (US); Paul Ribich, Lake Villa, IL (US); Dan Harvey, Lake Geneva, WA (US); Nawaz Kasam, Hanover Park, IL (US)

(73) Assignee: Watlow Electric Manufacturing Company, St Louis, MO (US)

( * ) Notice: Subject to any disclaimer, the term of this patent is extended or adjusted under 35 U.S.C. 154(b) by 0 days.

(21) Appl. No.: 10/439,727

(22) Filed: May 16, 2003
(Under 37 CFR 1.47)

(51) Int. Cl.
*H05B 3/06* (2006.01)

(52) U.S. Cl. ............... 219/536; 219/548; 219/552; 374/208; 338/25; 338/26

(58) Field of Classification Search ........... 219/536, 219/548, 552; 338/25, 28, 30, 26; 374/208, 374/185; 174/11 R
See application file for complete search history.

(56) References Cited

U.S. PATENT DOCUMENTS

| | | | |
|---|---|---|---|
| 2,012,112 A | 5/1935 | States | |
| 2,526,251 A * | 10/1950 | Medlar | 338/30 |
| 3,163,703 A * | 12/1964 | McLoad | 174/11 R |
| 3,592,059 A | 7/1971 | Chilton | |
| 3,952,276 A | 4/1976 | Walch et al. | |
| 4,955,980 A * | 9/1990 | Masuo | 374/185 |
| 5,161,894 A | 11/1992 | Bourigault | |
| 5,749,656 A | 5/1998 | Boehm et al. | |
| 5,864,282 A * | 1/1999 | Hannigan et al. | 338/30 |
| 6,130,598 A * | 10/2000 | Katsuki et al. | 338/28 |
| 6,639,505 B1 * | 10/2003 | Murata et al. | 338/25 |
| 6,698,922 B1 * | 3/2004 | Adachi et al. | 374/208 |
| 2002/0061049 A1 | 5/2002 | Adachi et al. | |

* cited by examiner

*Primary Examiner*—Robin Evans
*Assistant Examiner*—L Fastovsky
(74) *Attorney, Agent, or Firm*—Harness, Dickey & Pierce, P.L.C.

(57) ABSTRACT

An end seal for a temperature sensing probe. Electrical interface wiring is passed through a restraining element and is operatively coupled to a temperature sensing element or heater element mounted in the sheath. The sheath is formed around the restraining element in a shape that provides a net force inward as temperature variations expand and contract the restraining element.

42 Claims, 4 Drawing Sheets

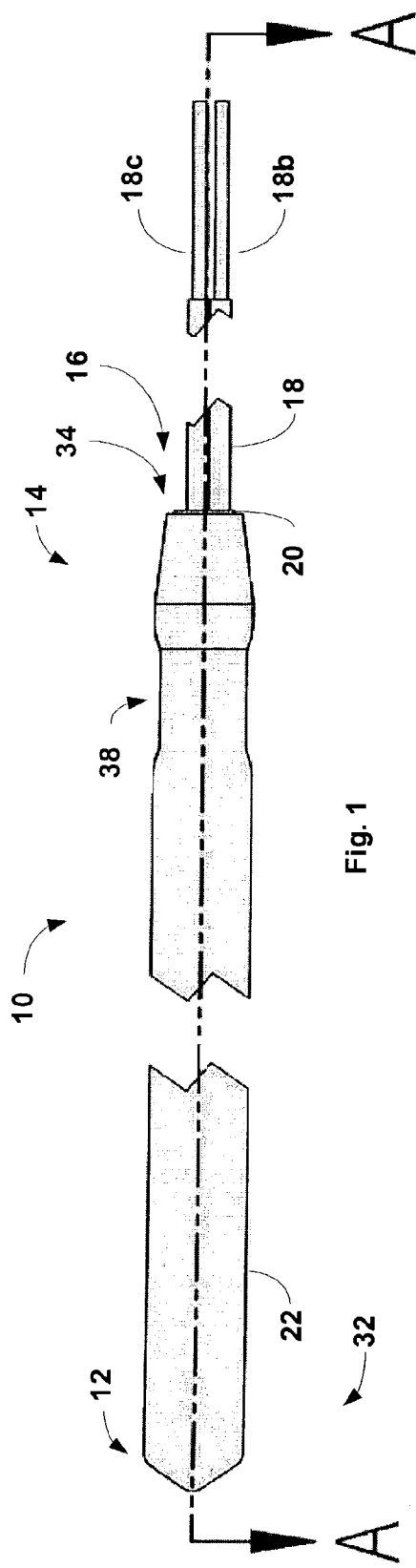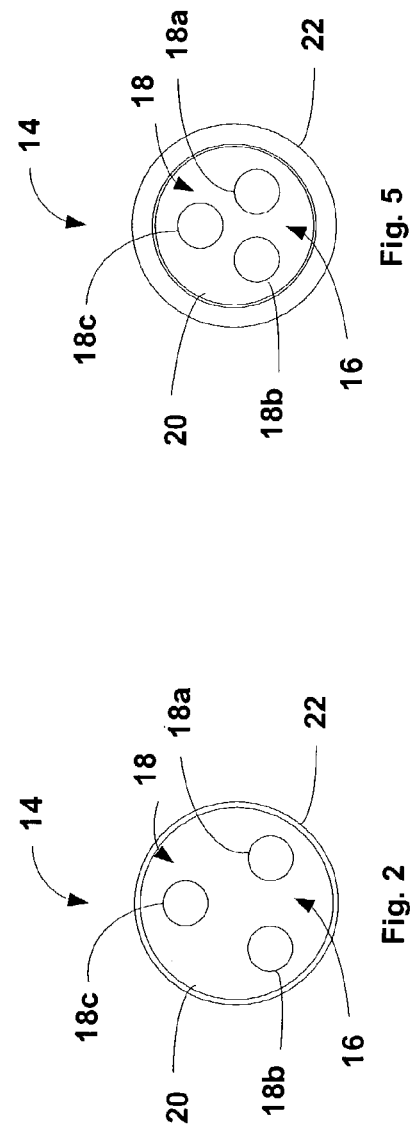

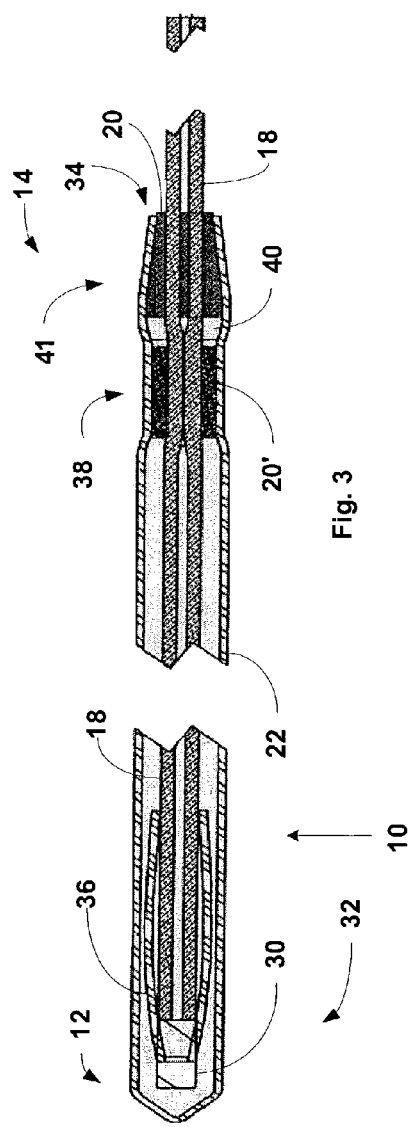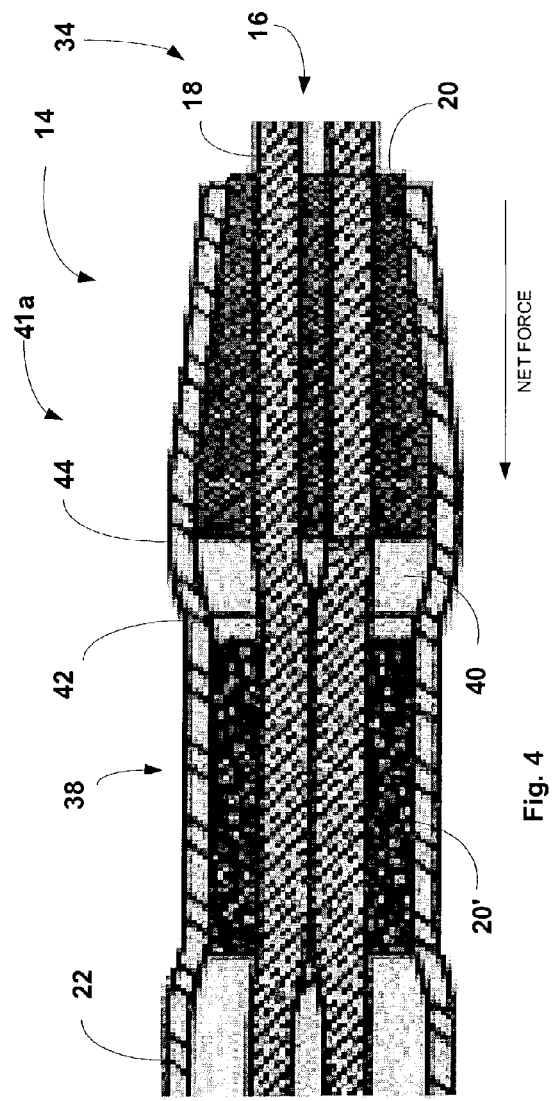

END SEAL DESIGN FOR TEMPERATURE SENSING PROBES

FIELD OF THE INVENTION

The present invention relates to an improved end seal configuration adapted for use with temperature sensing probes and sheathed heaters.

BACKGROUND

Temperature sensing probes, such as thermistors, resistance temperature detectors (RTD's) and resistance thermometers are used in a wide array of applications to provide temperature feedback of various media. In particular, temperature sensing probes are used in industrial process control, engine control, and the like, to measure the temperature of a process or device and provide the measured temperature to a remote device, such as a PID controller, for example. In response to the temperature feedback from the probe, the PID controller may alter system parameters to maintain and/or regulate the temperature of the process or device. Additionally, the temperature feedback from the probe may be used to alarm abnormal conditions (e.g., an over temperature warning).

Temperature sensing probes have what is commonly referred to as a hot end and a cold end. The hot end of the probe is the portion that is inserted into the media in which a temperature reading is desired. The cold end, on the other hand, is the portion of the probe that is used to mechanically mount the temperature sensing probe to a fixed member. The cold end may or may not be inserted in the media. Furthermore, the cold end provides an electrical interface to a remote device, such as a controller or temperature readout.

Temperature sensing probes include numerous components, such as, for example, a temperature sensing element, various wiring, resistors, diodes, switches, etc. Generally, the temperature sensing probe is subjected to harsh environments that easily can damage the components of the temperature sensing probe. Furthermore, the temperature sensing probe is subject to mechanical stress due to vibration from surrounding machinery. To minimize the potential for damage to the probe from environmental and mechanical stress, various packaging schemes have been implemented to protect the measuring circuitry of the probe.

Typically, the packaging schemes employed in temperature sensing probe construction include a sheath or housing, which is typically made of metal, plastic or ceramic. The sheath covers the temperature sensing element and the associated electrical components. The sheath protects the components of the probe from exposure to extreme temperature conditions and/or harsh environments (e.g., chemical environments). The packaging schemes also include intermediate components that attempt to hold electrical components in place and/or attempt to reduce mechanical and/or environmental damage to the probe components. The intermediate components may include greases, thermal greases, rubber, plastic, ceramic and/or metal devices.

Although design safeguards have been implemented in probe construction, environmental and/or mechanical damage still may occur due to various circumstances. For example, mechanical damage may occur to the electrical interface due to mechanical vibration and/or shock, causing fatigue and/or breakage of the electrical interface. Mechanical damage also may occur due to foreign objects striking the temperature sensing probe. Environmental damage may occur due to chemical, mechanical, liquid (e.g., water leakage) or other types of environmental attack. In particular, environmental damage is likely when the sheath has been breached and a contaminant enters the internals of the probe. Breach of the sheath is most likely to occur in the cold end of the probe, particularly where the electrical interface enters/exits the probe. Both environmental and mechanical damage to the probe may result in deterioration or complete failure of the temperature sensing function of the probe.

Some types of heaters are arranged in a similar fashion to the temperature sensing probes described above. For example, one or more heat producing elements (e.g., in the form of a coiled or uncoiled resistance wire, ceramic heater, etc.), along with any desired heat transferring components (e.g., radiating fins) and/or insulators, can be disposed in a sheath. One end of the sheath can be integrally closed with a longitudinal hollow body of the sheath. Integral closures can include unitary construction of the sheath or an end disk mechanically attached to the longitudinal body (e.g., by welding or swaging). An opposite end of the sheath can be sealed in similar fashion to conventional temperature sensing probes to allow conductors, control wires and so forth to exit the sheath and connect to external circuitry. The prior end seals for heaters have been susceptible to damage and/or failure in the same ways cold end seals for temperature sensing probes have experienced damage.

Accordingly, there is a need in the art for an end seal that provides improved sealing and restraining functions for the electrical interface.

SUMMARY OF THE INVENTION

According to one aspect of the invention, the invention is directed to a temperature sensing probe. The temperature sensing probe includes a sensor body defining an opening at a cold end; a temperature sensing element located within the sensor body adjacent a hot end; an electrical conductor electrically connected to the temperature sensing device and extending outward from the sensor body through the opening; and a restraining element defining a hole through which the electrical conductor passes and is restrained, wherein the cold end of the sensor body is formed around the restraining element in a shape effective to provide a net force inward on the restraining element by interaction with longitudinal sidewalls of the restraining element as the restraining element undergoes thermal expansion within the sensor body.

According to another aspect of the invention, the invention is directed to a temperature sensing probe. The temperature sensing probe includes a generally tubular sensor body defining an opening at a cold end; a temperature sensing element located within the sensor body adjacent a hot end; an electrical conductor electrically connected to the temperature sensing device and extending outward from the sensor body through the opening; and a restraining element defining a hole through which the electrical conductor passes and is restrained, wherein the sensor body is tapered around the restraining element.

According to yet another aspect of the invention, the invention is directed to a sheathed heater. The heater includes a generally tubular sheath having a closed end and a sealed end; a heater element disposed within the sheath; a conductor electrically coupled to the heater element, the conductor disposed at least partially in the sheath and having a portion extending out of the sheath through an opening defined by the sealed end; and a restraining element defining a hole through which the conductor passes and is restrained, wherein the sealed end of the sheath is formed around the restraining element in a shape effective to provide a net force inward on the restraining element by interaction with longitudinal sidewalls of the restraining element as the restraining element undergoes thermal expansion within the sheath.

BRIEF DESCRIPTION OF THE DRAWINGS

FIG. 1 is a detailed schematic diagram of a temperature sensing probe in accordance with an embodiment of the present invention.

FIG. 2 is an end view of a cold end of the temperature sensing probe of FIG. 1 prior to forming the cold end seal.

FIG. 3 is a cross section of the temperature sensing probe of FIG. 1 taken along the line A—A.

FIG. 4 is an enlarged cross section view of the cold end of the temperature sensing probe in accordance with one embodiment of the present invention.

FIG. 5 is an end view of the cold end of the temperature sensing probe of FIG. 1 after forming the cold end seal.

DETAILED DESCRIPTION OF THE INVENTION

Figure 6A:
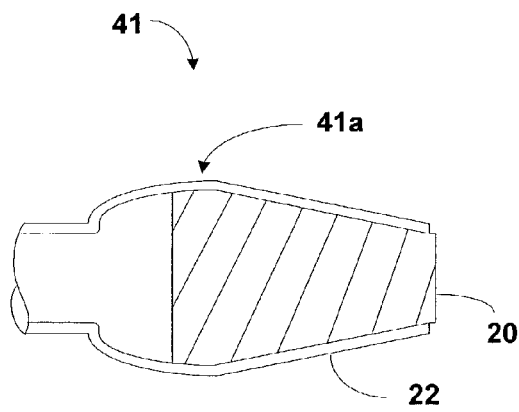
FIG. 6A is a cross section of a cold end having a tear shape in accordance with an embodiment of the invention.

In the detailed description that follows, corresponding components have been given the same reference numerals, regardless of whether they are shown in different embodiments of the present. To illustrate the present invention in a clear and concise manner, the drawings may not necessarily be to scale. Also, some features may be shown schematically.

Referring to FIG. 1, a temperature sensing probe 10 in accordance with the present invention is illustrated. One end of the temperature sensing probe 10 may be referred to as a hot end 12, which typically is inserted into a media for temperature measurement. The other end of the temperature sensing probe 10 may be referred to as the cold end 14. Although not illustrated, the cold end 14 can optionally be mounted to a fixed structure. For example, the cold end 14 may be attached to a rubber grommet, a compression fitting or a welded fitting, each of which may be mechanically attached to the fixed structure.

In the illustrated embodiment, the cold end 14 also includes an electrical interface 16 for connecting the probe 10 to remotely mounted equipment, such as a temperature controller and/or a temperature display, for example. With additional reference to FIGS. 2 and 5, the electrical interface 16 can include any medium that provides a link to another device for coupling temperature data. In an example embodiment, the electrical interface includes a conductor assembly 18. In the illustrated embodiment, the conductor assembly 18 include three insulated wires. The wires of the conductor assembly 18 may be electrically coupled to a temperature sensing element 30 (FIG. 3), such as a resistance temperature detector (RTD). A pair of conductors (e.g., conductor 18a and conductor 18c) may be used to transmit a low level voltage signal, which is generated across the terminals of a temperature sensing element, to remotely mounted equipment. Another pair of conductors (e.g., conductor 18a and conductor 18b) may be used to measure the resistance of the wire used to transmit the signal. By measuring the voltage across the temperature sensing element and knowing the resistance of the wire, an accurate calculation of the resistance of the temperature sensing element can be made. Using the calculated resistance, the actual temperature can be estimated using known resistance characteristics of the sensing element. It will be appreciated by those skilled in the art that alternative means for measuring and transmitting temperature signals are available and the use of a three wire conductor and an RTD are merely exemplary.

The electrical interface 16 can be held in place by a first restraining element 20 (also referred to as a retaining element). In one embodiment, the first restraining element 20 may be a device composed of resilient material, such as a rubber grommet, for example. Other materials for the first restraining element 20 can include, for example, magnesium oxide (e.g., MgO), silicon oxide (e.g., $SiO_2$), aluminum oxide (e.g., $Al_2O_3$), lava, a polymer, a filled polymer, fiberglass, mica, various composites, an epoxy, an epoxy preform, an elastomer, a filled elastomer and combinations thereof. Preferably, the restraining element 20 is made from a material that has electrical isolating properties and maintains mechanical integrity when compacted.

The first restraining element 20 may have an open core portion or portions (e.g., through holes along a longitudinal axis of the restraining element 20) through which the electrical interface 16 can pass. In this manner, the electrical interface 16 can traverse the first restraining element 20, thereby entering the body of the probe 10 from the cold end 14. Inside the probe 10, the electrical interface can connect to the temperature sensing element 30 and/or other electrical components mounted within the probe 10. The electrical interface 16 can be placed in or through the open core portion of the first restraining element 20, and the combination of the first restraining element 20 and the electrical interface 16 are placed in a housing or "sheath" 22 of the temperature sensing probe 10, preferably at the cold end 14 of the probe 10. In one embodiment, a portion of the restraining element 20, including an end of the restraining element 20 proximal the opening of the sheath, protrudes out of the opening in the cold end 14 of the sheath 22.

Referring now to FIG. 3 a cross sectional diagram of a temperature sensing probe 10 in accordance with the present invention is illustrated. The sheath 22, which may be metal, plastic, ceramic, or any other material used for the formation of temperature probes, protects the temperature sensing element 30 and any associated circuitry from harsh environments. The sheath 22 includes a closed end 32 at the probe's hot end 12 and an open end 34 at the probe's 10 cold end. The sheath can generally be tubular, such as a hollow cylindrical body, for example.

The temperature sensing element 30 is housed within the sheath 22 and typically resides adjacent the hot end 12 of the probe 10. The temperature sensing element 30 provides signals indicative of the temperature at the hot end 12 of the temperature sensing probe 10. Examples of temperature sensing elements include thermocouples, thermistors and RTDs, to name a few. The temperature sensing element 30 may include lead wires 36, which may be connected to the wire or wires of the conductor 18.

In one embodiment, the probe 10 includes a second restraining element 20' through which the conductor(s) 18 pass. The second restraining element 20' can be located between the hot end 12 and the cold end 14. Preferably, the second restraining element 20', if present, is located closely adjacent the restraining element 20. In one embodiment, the second restraining element 20' can be a retainer made from insulating material with frictional properties, such as a ceramic insulator, for example. Alternatively, any of the materials identified for the restraining element 20 can be used for the restraining element 20'. A region 38 of the sheath 22 around the second restraining element 20' can be reduced in diameter to secure the second restraining element 20' in the sheath 22. The reduced diameter region 38 may be created using known techniques, such as crimping, roll forming and/or swaging of the sheath 22 around the second restraining element 20'. The second restraining element 20' can be implemented to provide strain relief to the conductors 18 and/or to provide friction or other resistance to reduce pullout of the conductor(s) 18. In one embodiment, an intermediate cavity 40 is present between the first restraining element 20 and the second restraining element 20'. In an alternative embodiment, the restraining element 20 and the second restraining element 20' contact each other such that an intermediate cavity is not present. The intermediate cavity 40, if present, can be filled with a material, such as a powered, granulated, crushed or sintered insulator (e.g., magnesium oxide or ceramic).

With further reference to FIG. 4, the outer diameter of the sheath 22 surrounding the first restraining element 20 is reduced in diameter and/or formed in a shape 41 that provides a net force inward as the first restraining element 20 expands within the sheath 22. Inward force, as used herein, refers to a force directed from the open end 34 towards the closed end 32 of the probe 10 and generally in a direction along a longitudinal axis of the probe 10 (e.g., parallel with the longitudinal axis, running adjacent by not necessarily parallel to the longitudinal axis and/or co-linear with the longitudinal axis). Although the longitudinal side walls of the restraining element are compressed by and conform to the shape 41 of the sheath at the cold end 14, and the shape 41 defines interior side walls of the sheath 22 that are at least locally non-parallel to the longitudinal axis of the sheath, the net inward force is applied to the restraining element 20 as a whole. In one embodiment, the sheath 22 does not contact or apply a force to a proximal end of the restraining element 20 adjacent the opening, but still delivers a net inward force on the restraining element 20 as the restraining element expands due to increases in temperature.

The sheath 22 is formed around the restraining element 20 to secure the restraining element 20 and the electrical interface 16 (e.g., the conductor assembly 18) within the sheath 22. Moreover, as the sheath 22 is formed around the restraining element 20, the restraining element 20 is compressed by the sheath. As a result of the compression, the first restraining element 20 conforms to the shape of the sheath 22, thereby sealing the open end 34 of the probe 10 (e.g., a seal is created at the cold end 14).

The compression of the restraining element 20 also forms a seal between the restraining element 20 and the electrical interface 16. Referring briefly to FIGS. 2 and 5, the compression of the restraining element 20 is illustrated by the reduction in the diameter of the restraining element 20 and by the tighter packing of the conductors 18. The diameter of the sheath in FIG. 2 allows the insertion of the restraining element 20 and the electrical interface 16 into the sheath 22. After the sheath is formed or "shaped" around the restraining element 20 (FIG. 5), a seal is created that reduces the ability of contaminants from entering the temperature sensing probe 10 and damaging the probe's components.

The sheath 22 may be formed around the restraining element 20 using conventional techniques, such as crimping, roll forming and/or swaging, for example. As stated previously, the shape 41 formed around the restraining element 20 is a shape that provides a net force inward as the restraining element 20 expands. Additionally, the shape creates a seal that can naturally expand and contract longitudinally. In one arrangement, the sealing interfaces formed between the restraining element 20 and the sheath 22 and the restraining element 20 and the electrical interface 16 can expand into the intermediate cavity 40 between the first restraining element 20 and the second restraining element 20', if present. Once temperature cycling is complete and the probe 10 returns to an ambient temperature, the first restraining element 20 can return to its initial location.

Additionally, the shape 41 formed around the restraining element 20 can be a shape that provides increased sealing action during pressure buildup within the sensor.

Figure 6B:
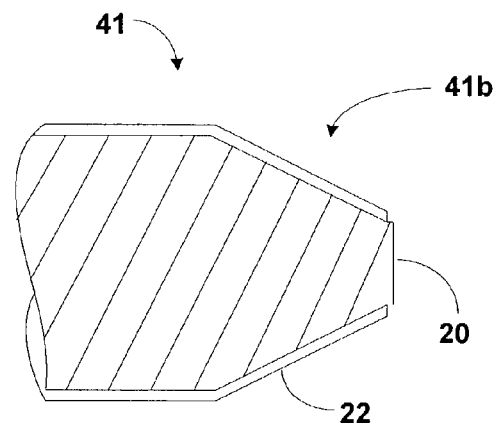
FIG. 6B is a cross section of a cold end having a reverse taper shape in accordance with another embodiment of the invention.
Figure 6C:
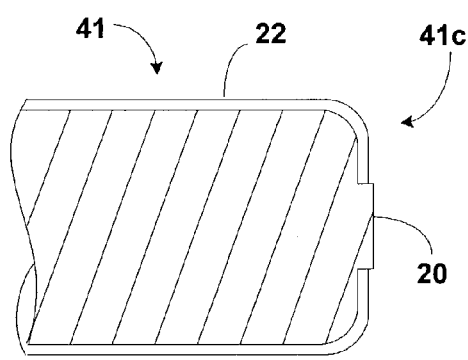
FIG. 6C is a cross section of a cold end having a rolled end shape in accordance with another embodiment of the invention.
Figure 6D:
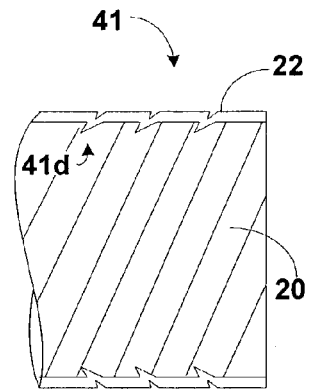
FIG. 6D is a cross section of a cold end having formed barbs in accordance with another embodiment of the invention.

Referring to FIGS. 6A–6D various example embodiments of shapes 41 are illustrated. As shown in FIG. 6A, the sheath 22 can be formed around the restraining element 20 in a tear shape 41a. For example, the shape can have a frustum shape proximal to the opening in the cold end 14 of the sheath 22. The wider end of the frustum mates with a generally parabolic curved portion of the shape 41 distal to the opening. As another example, the shape 41 can define a reverse taper 41b (e.g., a progressive narrowing of the diameter of the sheath 22 as the sheath 22 approaches the opening at the cold end 14) as shown in FIG. 6B. As indicated, these example shapes 41 (e.g., shapes 41a and 41b) are adapted to provide a net force inward on the restraining element 20 as the restraining element 20 undergoes thermal expansion, but without interaction with the proximal end of the restraining element 20. The entire proximal end of the restraining element 20 may protrude out of the sheath 22 through the opening in the cold end 14.

In alternative embodiments, the shape 41 may be formed to provide increased resistance to movement of the restraining element, thus enhancing retainment of the restraining element 20 and minimizing "extruding" of the restraining element 20 out of the open end of the sheath 22 during temperature cycling. For example, the sheath may include a rolled over edge 41c such that an end wall of the sheath 22 is formed. The end wall of the sheath 22 is disposed perpendicular to or at a large angle to a side wall of the sheath 22 such that the end wall of the sheath 22 contacts a portion of the proximal end of the restraining element 20. The end wall of the sheath 22 and the side wall of the sheath 22 can be joined by a radiussed corner.

As yet another example, barbs 41d pointed towards the hot end 12 can be included inside the sheath 22. The barbs 41d can be formed by deforming the sheath 22 from outside the sheath 22 to create the barb shape on the inside of the sheath 22. The deformation process can be carried out at the same time the sheath 22 is reduced in diameter around the restraining element 20 to create intimate contact between the inside diameter of the sheath 22 and the outside diameter of the restraining element 20. In this embodiment, the barbs 41d can protrude into the restraining element 20 and/or the diameter of the sheath 22 (except for the barbs 42d) can be relatively constant along the restraining element 20 (e.g., formed without a tear shape or taper).

Referring back to FIG. 4, forming the sheath 22 in a tear shape 41a (FIG. 6A) around the restraining element 20 results in a taper of the diameter of the sheath. The taper begins in a first region 42, where the tear shape begins. Moving towards the open end 34 of the probe 10, the diameter initially increases (in a curved or linear fashion) until a second region 44, where the diameter of the sheath 22 is approximately equal to the initial diameter of the sheath 22 before processing to form the shape 41. Now, moving from the second region 44 towards the open end 34 of the probe 10, the diameter of the sheath is tapered downward (in a curved or linear fashion) to a final or minimum diameter at the open end 34 of the probe. In one embodiment, the diameter of the sheath at the open end 34 is smaller than the diameter in the first region 42.

Figure 7:
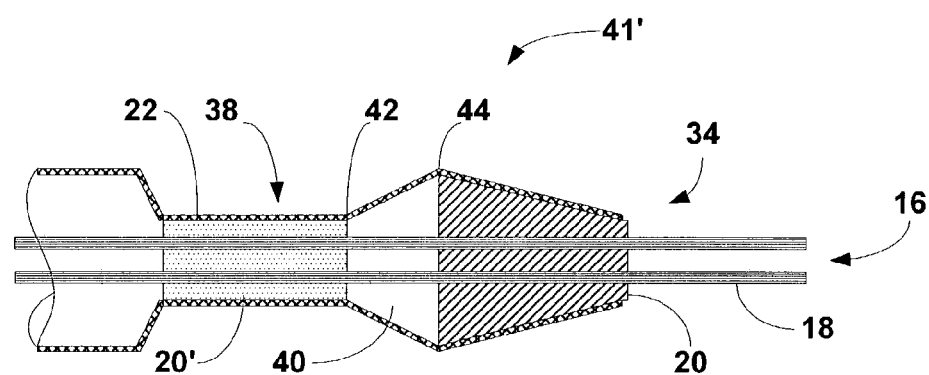
FIG. 7 is a cross section of a cold end in accordance with yet another embodiment of the present invention.

FIG. 7 illustrates an embodiment for a shape 41' utilizing a reverse taper of the open end 34 of the probe. The shape 41' provides a net force inward as the restraining element 20 expands within the sheath 22. Unlike the tear shape illustrated in FIG. 4, however, the reverse tapers illustrated in FIG. 5 and FIG. 7 have well-defined transition points (e.g., angular changes in the sheath's contour). For example, the diameter of the shape 41' has a well-defined increase in diameter at region 42. The diameter increases until region 44, where the diameter is at a maximum. The maximum diameter may be adjacent an end of the restraining element 20 distal the opening in the cold end 14 of the sheath 22. Moving from region 44 towards the open end 34 of the probe 10, the diameter progressively decreases. At the open end 34 of the probe 10, the diameter can be at a minimum value.

The cold end seal construction of the present invention has superior performance characteristics when compared to prior art temperature probe seals, particularly during temperature cycling. Prior art seals tend to have constant movement during temperature cycling. The movement may be either inward or outward from the probe, and the movement may continue until complete failure of the sealing function occurs. Extensive laboratory tests have shown the present invention to have superior performance. Furthermore, the seal construction of the present invention improves the restraining function of the seal. For example, the pullout resistance of the restraining element/conductor assembly has been shown to increase over prior art cold end seals.

Figure 8:
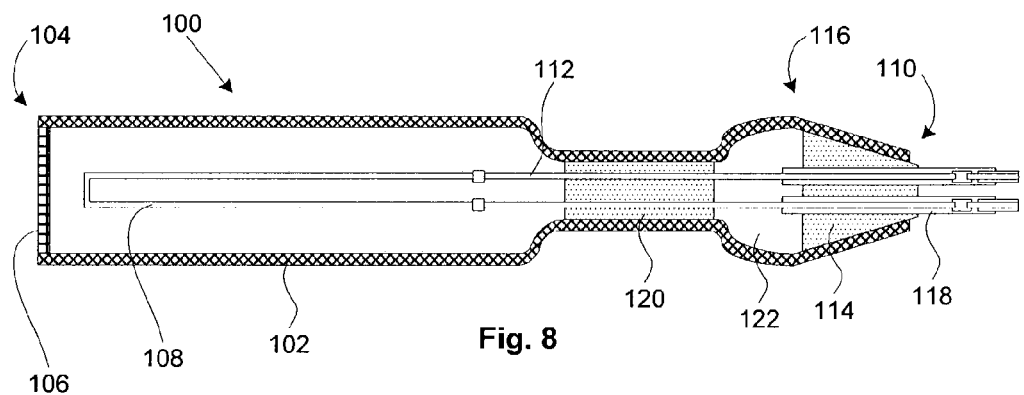
FIG. 8 is a cross section of a sheathed heater assembly in accordance with an embodiment of the present invention.

Referring now to FIG. 8, shown is a cross section of a sheathed heater assembly 100 having an end seal in accordance with certain aspects of the invention. The heater 100 can be configured as a cartridge heater or an insertion heater for use in a variety of industrial applications where a heat source is desired. Similar to the temperature sensing probe 10, the heater 100 has a sheath 102. In one embodiment, the sheath 102 is made from a metal, which is optionally oxidized. The sheath 102 has a first, closed end 104 and a second, sealed end 110. For example, to close the closed end 104, a disk 106 can be welded or otherwise attached (e.g., by rolling or swaging) to a tubular body of the sheath 102. Alternatively, the closed end 104 can have unitary construction with the tubular body portion of the sheath 102.

Disposed within the sheath 102 can be one or more heater elements 108, such as resistance wires (e.g., nickel chromium wire), ceramic elements and so forth. The heater elements 108 can be uncoiled as shown or coiled (e.g., resembling a spring). Although only one heater element 108 is shown, more than one heater element 108 can be provided and each element 108 can have a different length or position with respect to the sheath 102. If multiple heater elements 108 are provided, each heater element 108 can be independently controlled or arranged to generate different heat output levels. The heater element 108 can be disposed in a retaining medium and/or heat transferring medium, such as high density or compacted magnesium oxide, in an inner sheath, in a refractory material, and/or in an insulator.

The heater element 108 can include or be connected to (e.g., metallurgically bonded to) conductive leads 112, such as pins or wires for providing electrical power to the heater element 108. The leads 112 are retained by a restraining element 114. For example, the leads 112 can pass through holes defined by the restraining element 114. Similar to the restraining element 20 of the probe 10, the restraining element 114 can be made of any material that is electrically insulative and has good mechanical integrity through thermal cycling and compression. Example materials include, but are not limited to rubber, magnesium oxide (e.g., MgO), silicon oxide (e.g., $SiO_2$), aluminum oxide (e.g., $Al_2O_3$), lava, a polymer, a filled polymer, fiberglass, mica, various composites, an epoxy, an epoxy preform, an elastomer, a filled elastomer and combinations thereof. The restraining element 114 can resemble a grommet.

The restraining element 114 can be disposed in the sheath at the sealed end 110. The sealed end 110 has a shape 116 for exerting a net inward force on the restraining element 114 when the restraining element 114 thermally expands. The shape 116 may also radially compress at least a portion of the restraining element 114. Similar to the probe 10, the shape 116 can be, but is not limited to, any one of the tear shape 41a, the taper shapes 41b, 41', or the rounded over shape 41c as described in greater detail above. The shape 116 can also include barbs 41d.

In one embodiment, the leads 112 extend through the restraining element 114 from the sealed end 110 and mate with an adapter (not shown). In another embodiment, the leads 112 can be insulated with insulation 118 and are joined inside or outside the sheath 102 to insulated wires, using, for example, a crimped electrical connector. In this embodiment, the insulation 118 can be disposed between the leads 112 and the restraining element 114 such that the insulation 118 at least partially enters the sheathed cavity.

Similar to the probe 10, the heater 100 can include a second restraining element 120 that is retained in place by a reduction in the diameter of the sheath 102. An intermediate cavity 122 between the restraining elements 114, 120 can also be present.

The seal provided by the restraining element 114 and shape 116 function in similar manner to the seal provided by the restraining element 20 and shape 41 of the probe 10. Accordingly, the advantages in terms of seal performance realized for the probe 10 can apply to the heater 100 having the seal end 110 made in accordance with the present invention.

While particular embodiments of the invention have been described in detail, it is understood that the invention is not limited correspondingly in scope, but includes all changes, modifications and equivalents coming within the spirit and terms of the claims appended hereto.

What is claimed is:

1. A temperature sensing probe, comprising:
    a sensor body defining a hot end and an opening at a cold end, said sensor body dimensioned to include a tapered section tapered from a first diameter at the opening to a larger second diameter at a distance from the opening;
    a temperature sensing element located within the sensor body adjacent the hot end;
    an electrical conductor electrically connected to the temperature sensing device and extending outward from the sensor body through the opening; and
    a restraining element configured to thermally expand when exposed to heat, defining a hole through which the electrical conductor passes and is restrained and positioned substantially within the tapered section, wherein the restraining element is compressed and frictionally engaged by an inner surface of the tapered section.

2. The temperature sensing probe of claim 1, wherein the tapered section has a progressive increase in diameter and wherein the sensor body has a section with a progressively decreasing diameter starting from the point adjacent an end of the restraining element distal from the opening and decreasing in a longitudinal direction towards the hot end.

3. The temperature sensing probe of claim 2, wherein the progressive increase is linear and the progressive decrease is curved.

4. The temperature sensing probe of claim 2, wherein the progressive increase is linear and the progressive decrease is linear.

5. The temperature sensing probe of claim 1, wherein the restraining element comprises a resilient material and the restraining element conforms to the cold end shape of the sensor body.

6. The temperature sensing probe of claim 1, wherein the restraining element is a grommet.

7. The temperature sensing probe of claim 1, further comprising a second restraining element disposed in the sensor body and between the restraining element at the cold end and the hot end.

8. The temperature sensing probe of claim 7, wherein the sensor body defines a reduced diameter section having a third diameter that is less than the second diameter, said reduced diameter section having a substantially constant diameter along its length, and a hot end section starting at an end of the reduced diameter section and having a fourth diameter that is greater than or about equal to the second diameter, the second restraining element positioned within the reduced diameter section, said second restraining element having a length equal to or less than a length of the reduced diameter section.

9. The temperature sensing probe of claim 7, wherein the restraining elements are in contact with each other.

10. The temperature sensing probe of claim 7, wherein the restraining elements are spaced apart to define an intermediate cavity therebetween.

11. The temperature sensing probe of claim 1, wherein the cold end defines a wall across at least a portion of the cold end opening, said wall retaining the restraining element from movement outward through the cold end opening.

12. The temperature sensing probe of claim 1, wherein the cold end includes a rolled over edge that at least in part defines the opening.

13. The temperature sensing probe of claim 1, further comprising at least one formed barb on an interior wall of the sensor body adjacent an end of the restraining element near the cold end opening, the barb adapted to engage only the end of the restraining element near the cold end opening and restrict the movement of the end of the restraining element outward through the opening.

14. A method of fabricating the temperature sensing probe of claim 1, comprising reducing the diameter of the cold end of the sensor body with the restraining element in place.

15. The method of claim 14, wherein the step of reducing includes at least one of crimping, roll forming and swaging the sensor body.

16. A temperature sensing probe, comprising:
a generally tubular sensor body defining a hot end and an opening at a cold end and having a longitudinal axis, said sensor body defining a first diameter about the cold end opening and a second internal diameter at a distance along the longitudinal axis from the cold end, said second diameter being greater than the first diameter, said body defining a tapered section having a continuous taper between the first internal diameter and the second internal diameter;
a temperature sensing element located within the sensor body adjacent the hot end;
an electrical conductor electrically connected to the temperature sensing device and extending outward from the sensor body through the opening; and
a restraining element configured to thermally expand when exposed to heat and defining a hole through which the electrical conductor passes and is restrained, wherein the restraining element is substantially positioned within the tapered section.

17. A temperature sensing probe comprising:
a generally tubular sensor body defining a hot end and an opening at a cold end, said body defining a first section with a progressively increasing diameter beginning at a first diameter at the opening and increasing towards the hot end to a second diameter, and a second section having a decreasing diameter beginning at the second diameter at the end of the first section and decreasing to a third diameter;
a temperature sensing element located within the sensor body adjacent the hot end;
an electrical conductor electrically connected to the temperature sensing device and extending outward from the sensor body through the opening; and
a restraining element configured from a resilient material positioned within the tubular sensor body and defining a hole through which the electrical conductor passes and is restrained, wherein the restraining element is dimensioned and positioned to have at least a substantial portion of the length of the restraining element within the first section.

18. The temperature sensing probe of claim 16, wherein the cold end defines a wall across at least a portion of the cold end opening, said wall retaining the restraining element from movement outward through the cold end opening.

19. The temperature sensing probe of claim 16, wherein the cold end includes a rolled over edge that at least in part defines the opening.

20. The temperature sensing probe of claim 16, further comprising at least one formed barb on an interior wall of the sensor body adjacent an end of the restraining element near the cold end opening, the barb adapted to engage only the end of the restraining element near the cold end opening and restrict the movement of the end of the restraining element outward through the opening.

21. The temperature sensing probe of claim 17, wherein the cold end defines a wall across at least a portion of the cold end opening, said wall retaining the restraining element from movement outward through the cold end opening.

22. The temperature sensing probe of claim 21, wherein the wall includes a rolled over edge that at least in part defines the opening.

23. The temperature sensing probe of claim 17, further comprising at least one formed barb on an interior wall of the sensor body adjacent an end of the restraining element near the cold end opening, the barb adapted to engage only the end of the restraining element near the cold end opening and restrict the movement of the end of the restraining element outward through the opening.

24. The temperature sensing probe of claim 1 wherein the tapered section compresses the restraining element along greater than one half of the total length of the longitudinal sidewalls of the restraining element.

25. The temperature sensing probe of claim 1 wherein the temperature sensing element is selected from the group consisting of a resistance temperature detector (RTD), a thermistor, and a thermocouple.

26. The temperature sensing probe of claim 1 wherein the tapered section has a frustum shape.

27. The temperature sensing probe of claim 1 wherein the restraining element includes a portion that at least partially extends outward from the cold end of the sensor body.

28. The temperature probe of claim 16 wherein the sensor body and the restraining element are configured and dimensioned to interact to provide a net force generally in a direction of the longitudinal axis and directed from the cold end towards the hot end when the restraining element expands due to an increased temperature.

29. The temperature sensing probe of claim 16 wherein the temperature sensing element is selected from the group consisting of a resistance temperature detector (RTD), a thermistor, and a thermocouple.

30. The temperature sensing probe of claim 16 wherein the tapered section has a frustum shape.

31. The temperature sensing probe of claim 16 wherein the restraining element includes a portion that at least partially extends outward from the cold end of the sensor body.

32. The temperature sensing probe of claim 17 wherein the temperature sensing element is selected from the group consisting of a resistance temperature detector (RTD), a thermistor, and a thermocouple.

33. The temperature sensing probe of claim 17 wherein the first section has a frustum shape.

34. The temperature sensing probe of claim 17 wherein the restraining element includes a portion that at least partially extends outward from the cold end opening.

35. The temperature sensing probe of claim 17 wherein the restraining element is the first restraining element, further comprising a second restraining element positioned between the hot end and the first restraining element.

36. A temperature sensing probe comprising:
   a generally tubular sensor body defining a closed hot end, a cold end, a cavity, and an opening into the cavity at the cold end, the body having a first section with a progressively increasing diameter section beginning at a first diameter at the opening and increasing to a second diameter towards the hot end, a second section having a decreasing diameter beginning at the second diameter and decreasing for a length towards the hot end to a third diameter, a third section having a substantially constant diameter about equal to the third diameter and beginning at the end of the second section, and a hot end diameter that is about equal to or greater than the second diameter that begins at a hot end of the third section;
   a first restraining element configured from a resilient material is compressed within at least the first section and defines a first conductor hole therethrough;
   a second restraining element compressed at least within the third section and defines a second conductor hole therethrough;
   a temperature sensing element positioned within the sensor body adjacent the hot end; and
   an electrical conductor electrically connected to the temperature sensing device and passing through the second conductor hole of the second restraining element and the first conductor hole of the first restraining element and outward of the cold end of the sensor body.

37. The temperature sensor probe of claim 36 wherein the first restraining element has a length substantially equal to or greater than the length of the first section.

38. The temperature sensor probe of claim 36 wherein the second restraining element has a length substantially equal to or less than the length of the third section.

39. The temperature sensing probe of claim 36 wherein the temperature sensing element is selected from the group consisting of a resistance temperature detector (RTD), a thermistor, and a thermocouple.

40. The temperature sensing probe of claim 36 wherein the tapered section has a frustum shape.

41. The temperature sensing probe of claim 36 wherein the first restraining element includes a portion that at least partially extends outward from the cold end of the sensor body.

42. A method of fabricating the temperature sensing probe of claim 36, comprising:
   inserting the second restraining element and the first restraining element into the cavity of the sensor body;
   reducing a diameter of the sensor body in the first section and about the first restraining element to compress the first restraining element in place; and
   reducing a diameter of the sensor body in the third section and about the second restraining element to compress the second restraining element in place,
   wherein each diameter reduction includes at least one of crimping, roll forming and swaging.

* * * * *